Patented Nov. 27, 1945

2,389,855

UNITED STATES PATENT OFFICE 2,389,855

RUBBER LUBRICANT

Harold G. Johnson, Terre Haute, Ind., assignor to Commercial Solvents Corporation, Terre Haute, Ind., a corporation of Maryland No Drawing. Application March 25, 1944, Serial No. 528,157

6 Claims. (Cl. 252—49.5)

The present invention relates to new rubber lubricant compositions and more particularly, it relates to a form of stabilized rubber lubricants capable of remaining in a highly emulsified state when stored for extended periods of time.

As a result of the widespread use of rubber parts in the automotive and other industries, there arose a need for a special type of rubber lubricant in order to prevent excessive wear and squeaking of rubber surfaces which came in contact with other rubber or metal parts. One of the most common examples of rubber parts which require lubrication is that associated with the use of rubber in spring shackles of automobiles. The rubber parts utilized in weigh bar bearings, trunnions, axle spring seats, shock absorber links, and fan belts are additional uses of rubber which present a special lubrication problem. While common lubricants may for a relatively short time serve to lubricate rubber parts subject to friction, such practice results in the ultimate softening and deterioration of the rubber, owing chiefly to the high hydrocarbon content of ordinary lubricants.

In an effort to solve this problem, lubricants have been proposed which consist mainly of colloidal or powdered graphite suspended in water, together with a substantial portion of a water-soluble substance such as glycerine, which also acts as a lubricant and assists in preventing the drying out of the composition after it has been applied to the surface to be lubricated. While lubricants of this type are substantially harmless to rubber and satisfactorily lubricate the surfaces thereof with which they come in contact, they are not entirely free from certain material defects. For instance, the graphite in rubber lubricant compositions of the above type, tends to settle out after standing for a short time. This characteristic constitutes a special disadvantage since the general method of applying such compositions to rubber parts requiring lubrication is by means of a spray gun. Under such circumstances, if adequate lubrication is to be secured, the lubricating mixture must be thoroughly agitated prior to spraying or otherwise only the non-lubricating ingredients are applied. A further disadvantage characteristic of such rubber lubricants is their relatively low penetrating power.

I have now discovered a rubber lubricant composition that is highly effective as a lubricant, and at the same time is harmless to rubber; it remains in the form of a stable aqueous emulsion on standing undisturbed for extended periods of time and possesses a high penetrating power, thus enabling it to reach rubber surfaces subject to wear which cannot be directly reached by spraying or other means. The active ingredients present in the rubber lubricant of my invention comprise principally (1) from about 1.5 to approximately 5.0 per cent of a fatty acid having from twelve to eighteen carbon atoms, (2) an amino compound such as 2-amino-2-methyl-1,3-propanediol, 2-amino-2-methyl-1-propanol, or the equivalent thereof, the amino compound being present in an amount corresponding to form about 30 to 100 per cent in excess of that required to neutralize the fatty acid present, (3) from between approximately 1.0 and 2.0 per cent bentonite or equivalent thereof, (4) and colloidal graphite in an amount ranging from about 0.03 to 1.0 per cent. The lubricating properties of compositions of the above general type may be enhanced by the addition of from between about 20 and 30 per cent of castor oil, or similar material. The penetrating power of my lubricant composition can also be improved by the addition of approximately 10 per cent of a solvent mixture containing a major proportion of ethyl alcohol and a minor proportion of ethyl acetate. Other solvent mixtures of a similar character may likewise be added, however, to the lubricants of my invention, to improve the penetrating power thereof.

In preparing a preferred form of my new rubber lubricant, the fatty acid and castor oil are mixed and heated to a temperature of 60 to 70° C., if necessary, in order to effect solution of the acid. To a separate vessel containing water at a temperature of approximately 70° C., bentonite is added, with stirring, in order to obtain a finely-divided aqueous suspension thereof. To a third separate vessel, containing the required amount of amino compound, is added, with agitation, graphite in suitable form, preferably as an aqueous suspension. The resulting mixture can then be added with stirring to the aqueous bentonite suspension and thereafter the combined mixture is added, with agitation, to the solution of fatty acid in castor oil. To the mixture thus obtained is then introduced an aqueous mixture of alcohol and ethyl acetate in the proportions generally specified above. The entire mixture is then agitated until the emulsion is uniform. After the product appears to be completely emulsified, it is ready for storage or immediate use.

In connection with the formulation of my rubber lubricant compositions, various factors concerning the particular ingredients employed and the concentration thereof should be taken into consideration. For example, I have observed that compounds such as sodium oleate do not function as suitable emulsifying agents in any proportion. Also, in general, if substantially less than a 30 per cent excess of amino compound over that required to neutralize the fatty acid present is employed, a stable emulsion is not produced. Furthermore, I have found that a stable emulsion does not ordinarily result when the graphite is added to the mixture in the form of a castor oil suspension. I have further found that stable emulsions are obtained only if bentonite is present in amounts ranging from about 1.0 to 2.0 per cent and above. Concentrations of bentonite substantially below 1.0 per cent result in the formation of unstable emulsions. In general it may be said that, increasing the amount of bentonite beyond 2.0 per cent is not desirable because of the increase in solids content as the composition evaporates. However, an increase in bentonite content does aid in stabilizing the emulsion and within limits, permits a slight decrease in the amount of emulsifying agent required.

As examples of fatty acids which may be utilized in preparing the rubber lubricant compositions of my invention, there may be mentioned lauric acid, palmitic acid, myristic acid, oleic acid, stearic acid, and the like.

Among the bases suitable for use in preparation of emulsifying agents utilized in the compositions of my invention, there may be mentioned 2-amino-2-methyl-1-propanol, 2-amino-2 - methyl - 1,3 - propanediol, isobutanol - amine, tris(hydroxymethyl)amino methane, triethanolamine, various mixtures of these bases, and the like.

A convenient form in which the colloidal or semi-colloidal graphite can be added consists of an aqueous suspension containing approximately 20 per cent graphite. This material may be added in other forms; however, it frequently becomes necessary to modify the formulation procedure somewhat.

The examples which follow are typical of the rubber lubricant compositions contemplated by my invention. However, it is to be specifically understood that such examples are merely illustrative and in no way limitative. The ingredients of these compositions were mixed in accordance with the procedure generally outlined above.

Example I

| | Lbs./1,000 gal. |
|---|---|
| Castor oil, No. 3 grade | 1,850 |
| Oleic acid | 200 |
| Water (70° C.) | 2,500 |
| Bentonite (minus 625) | 110 |
| Water (70° C.) | 500 |
| 2-amino-2-methyl-1,3-propanediol | 160 |
| 20% suspension of colloidal graphite in water | 20 |
| Shellacol (92.3% ethyl alcohol (95%), 5.7% wood alcohol, 1% ethyl acetate, and 1% gasoline—percent by volume) | 800 |
| Water | 2,060 |

Example II

| | Lbs./1,000 gal. |
|---|---|
| Castor oil, No. 3 grade | 1,850 |
| Oleic acid | 200 |
| Water (70° C.) | 2,500 |
| Bentonite (minus 625) | 110 |
| Water (70° C.) | 500 |
| 2-amino-2-methyl-1-propanol | 165 |
| 20% suspension of colloidal graphite in water | 20 |
| Shellacol (92.3% ethyl alcohol (95%), 5.7% wood alcohol, 1% ethyl acetate, and 1% gasoline—percent by volume) | 800 |
| Water | 2,060 |

Example III

| | Lbs./1,000 gal. |
|---|---|
| Castor oil, No. 3 grade | 1,850 |
| Oleic acid | 200 |
| Water (70° C.) | 2,500 |
| Bentonite (minus 625) | 110 |
| Water (70° C.) | 500 |
| Isobutanolamine | 155 |
| 20% suspension of colloidal graphite in water | 20 |
| Shellacol (92.3% ethyl alcohol (95%), 5.7% wood alcohol, 1% ethyl acetate, and 1% gasoline—percent by volume) | 800 |
| Water | 2,060 |

The rubber lubricants having the above composition gave fine, uniform emulsions which were not broken by freezing and which still remained in an emulsified state after standing undisturbed for a period of six months.

It will be apparent to those skilled in the art that the rubber lubricant compositions of my invention are subject to numerous obvious modifications. It is therefore to be specifically understood that such modifications are to be considered as lying within the scope of my invention.

My invention now having been described, what I claim is:

1. A rubber lubricant composition capable of remaining in an emulsified state when allowed to stand undisturbed for extended periods of time, which consists of an aqueous emulsion containing as active lubricating ingredients from 1.5 to 5.0 per cent of a fatty acid having from twelve to eighteen carbon atoms, an amino hydroxy compound selected from the class consisting of isobutanolamine, triethanolamine, tris(hydroxymethyl)aminomethane, 2-amino-2-methyl-1-propanol, and 2-amino-2-methyl-1,3-propanediol, said amino hydroxy compound being present in an amount corresponding to from about 30 to 100 per cent in excess of that required to neutralize said fatty acid, from between about 1.0 to about 2.0 per cent bentonite, and colloidal graphite in an amount ranging from about 0.03 to 1.0 per cent.

2. A rubber lubricant composition capable of remaining in an emulsified state when allowed to stand undisturbed for extended periods of time, consisting of an aqueous emulsion containing between about 20.0 and 30.0 per cent castor oil, approximately 10 per cent of a mixture comprising a major proportion of ethyl alcohol and a minor proportion of ethyl acetate, from about 1.5 to about 5.0 per cent of a fatty acid having from twelve to eighteen carbon atoms, an amino hydroxy compound selected from the group consisting of 2 - amino-2-methyl-1,3-propanediol, and 2-amino-2-methyl-1-propanol, triethanolamine, tris(hydroxymethyl)aminoethane and isobutanolamine, said amino hydroxy compound being present in an amount which is from about 30 to 100 per cent in excess of that required to neutralize said fatty acid, from between about 1.0 and 2.0 per cent bentonite and colloidal graphite in an amount ranging from about 0.03 to 1.0 per cent.

3. The rubber lubricant composition of claim 2 in which the fatty acid is oleic acid.

4. The rubber lubricant composition of claim 2 in which the fatty acid is oleic acid and the amino hydroxy compound is 2-amino-2-methyl-1,3-propanediol.

5. The rubber lubricant composition of claim 2 in which the amino hydroxy compound is 2-amino-2-methyl-1-propanol.

6. The rubber lubricant composition of claim 2 in which the amino hydroxy compound is isobutanolamine.

HAROLD G. JOHNSON.